United States Patent [19]

O'Hare

[11] Patent Number: 4,964,970

[45] Date of Patent: Oct. 23, 1990

[54] COMPACT LOW VOLUME WATER PURIFICATION APPARATUS

[75] Inventor: Harry O'Hare, Thousand Oaks, Calif.

[73] Assignee: HOH Water Technology Corp., Newbury Pk., Calif.

[21] Appl. No.: 253,624

[22] Filed: Oct. 5, 1988

[51] Int. Cl.$^5$ ............................................. B01D 61/48
[52] U.S. Cl. ................................. 204/301; 204/182.4; 204/182.5
[58] Field of Search .................... 204/182.4, 182.5, 301

[56] References Cited

U.S. PATENT DOCUMENTS 4,105,534  8/1978  Beatty III ........................ 204/182.4
4,465,573  8/1984  O'Hare ............................... 204/301

Primary Examiner—John F. Niebling
Assistant Examiner—David G. Ryser
Attorney, Agent, or Firm—James A. Quinton; Frank Frisenda, Jr.

[57] ABSTRACT

A compact water purification device which is made of concentrically mounted components is provided according to the invention. An anode with a fluid passageway through its interior to provide an anode fluid path is used. A anionic support member is concentrically mounted about the anode and a anionic membrane is mounted to the exterior of the anionic support member. A first fluid passageway between the anionic membrane and the anode is provided. A bead is concentrically mounted about the anionic support member to provide a water purification path and to hold the ion exchange resins therein for contact with the water in the water purification path. Fluid communication is maintained between the water purification path and the anionic membrane. A cationic membrane is concentrically mounted about the exterior of the bead box. Fluid communication is provided between the water purification path and the cationic membrane. A cathode is concentrically mounted about the cationic membrane. A passageway is provided between the cationic membrane and the cathode to define a second fluid passageway. An anolyte waste stream through said anode fluid path and through said first fluid passageway is provided as well as a catholyte waste stream. The resulting device provides a compact effective water purification unit.

19 Claims, 8 Drawing Sheets

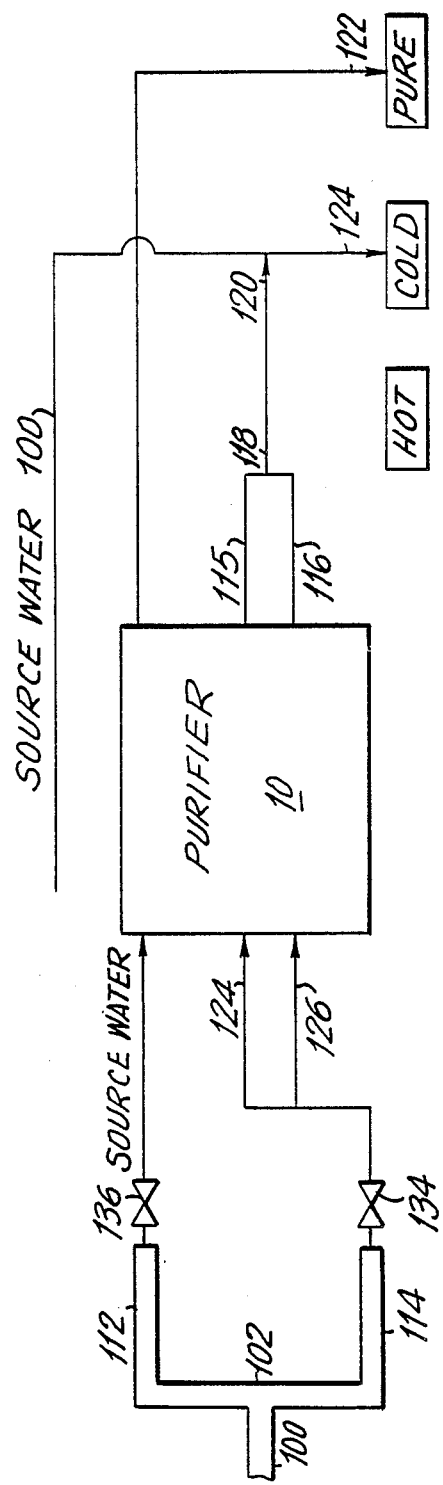

COMPACT LOW VOLUME WATER PURIFICATION APPARATUS

BACKGROUND OF THE INVENTION

1. Field of the Invention

The field of the present invention is water purification systems and specifically systems employing electrodialysis. The subject system relates to a compact water purification system which is particularly useful for low volume use.

2. Description of the Prior Art

Advanced water purification systems have been developed which make use of both the concepts of electrodialysis and ion exchange systems in a single device. For example, U.S. Pat. No. 4,465,473 discloses such a system. However, there is still a need for further improved apparatuses and methods for water purification, particularly those which are adaptable for use in low volume situations wherein the amount of space that can be readily devoted to the apparatus is limited. Thus, one of the difficulties in the prior art devices was that the devices were often large and bulky and more suited for large, commercial use rather than use in applications where space is at a premium such as for installion under the sink or for use on a boat or in recreational vehicles.

SUMMARY OF THE INVENTION

The present invention is directed to an improved water purification system, both a method and apparatus and components therefor. The present invention further relates to a water purification system which is particu.-larly adaptable for use in low volume situations which require a compact unit that takes up only a limited amount of space. For example, the subject invention is particularly useful in residential settings, such as under-the-sink installations, for marine use on boats, yachts and the like, and for use in recreational vehicles such as campers or trailers, or for use in any circumstance where a compact low volume unit is required.

The present invention relates to a compact apparatus for purification of water and the method relating thereto. According to the invention, a compact apparatus is provided, which is particularly advantageous in uses which require low volumes of purified water on the order of less than one or two gallons per minute, and in such instances where there is a limited space available for the apparatus. The invention further relates to a system which combines concepts of electrodialysis with ion exchange systems. The combination is so employed in the present invention that the ion exchange resins aid the electrodialysis system by providing enhanced conductivity particularly useful as the water becomes freer of such ions. The electrodialysis mechanism aids in helping to regenerate the resins through the disassociation of water into hydrogen and hydronium cationics and hydroxic anionics. A continually regenerating system is established with these mechanisms of the purifier system working in combination to effectively remove the required ions from the water.

The present invention is particularly suited for use in homes, in under-the-sink, single faucet installations. According to the invention, the principal components of the purification apparatus are mounted concentrically about the same axis to provide a compact efficient water purification device. The compact water purification apparatus comprises a plurality of concentric sleeves or cylinders which define passageways therebetween. The concentric cylinders are themselves the components of the water purification device and, as a result, a compact apparatus is provided.

An anode, preferably a hollow cylindrical anode, is provided at the core of the device. The anode has a passageway through the center for flow of water therethrough.

Concentrically mounted around the anode is a anionic membrane support member. A anionic membrane is attached to the support and such membrane is preferably bonded to the support. Such bonding can be performed by lamination, welding or injection molding.

Preferably support ribs, particularly verticle spacers extend from the anionic membrane and optionally may be integral therewith to provide support for the membrane and also to separate it from the anode. Such separation provides a fluid passageway between the anode and the anionic membrane.

A bead box is concentrically mounted about the anionic membrane support member. The bead box is preferably formed in two pieces. The bead box inner is mounted to the anionic membrane support member. Optionally the bead box inner can be integral with the anionic support member and comprise its outer cylindrical surface. The bead box inner has slot which provide for liquid communication between the bead box inner and the anionic membrane. The slots are of a small enough size as to not allow the ion exchange resins contained therein to pass therethrough.

A bead box outer is provided fcr concentric mounting about the bead box inner to form passageways for the flow of water The bead box inner and outer preferably contain ribs and baffles. When the bead box inner and outer a.re joined, the ribs define fluid passageways which twist the fluid in a tortuous path over the beads. The baffles on the inner and outer bead box for compartments which retain the beads in place. The fluid passageways defined by the ribs are sufficiently narrow that the beads cannot be washed from between the baffles and are hence held in pockets formed by the baffles. Slots are provided in the inner and outer bead box for fluid communication between the passageway defined by the bead box and the interior an exterior of the bead box.

Ion exchange resins are packed in the bead box preferably in the pockets formed by the bead box for ionic exchange communication with the fluid flowing through the passageways formed by the inner and outer bead box assembly.

A cationic membrane is concentrically mounted to the outer bead box. The cationic membrane may be bonded, laminated, welded, or mechanically connected to the outer bead box. The cationic membrane has fluid communication between the passageways of the bead box through slots that extend through the bead box outer.

A cathode is concentrically mounted to the body. Spacers are also preferably provided to maintain a passageway between the cationic membrane and the concentrically mounted cathode. The ribs of the spacer may optionally be integral with the cationic membrane.

In operation, source water is supplied as an anolyte stream. Such stream can enter the center of the anode from the top and flows down the length of the anode inner and outer wall. The resulting water stream then is cycled to the cold water faucet in the sink for use as general purpose, non-purified water. Similarly, a catholyte stream can be formed by cycling water from the water supply to the space defined between the cathode and the cationic membrane and then returned to the cold water tap. Optionally, a single waste stream can be used. For example, source water can be supplied to the space between the anionic membrane and the anode from the bottom over the top of the anode and through its hollow core. The anolyte stream can then be used as the catholyte stream by then passing it up through the space between the cathode and cationic membrane.

A purified water stream is provided by supplying source water for purification to the space between the inner and outer bead box. Source water enters the bead box cover then flows into passageways defined by the inner and outer of the bead box. Purified water exits at the opposite end.

The preferred embodiment of the present invention is illustrated in the drawings and examples. However, it should be expressly understood that the present invention should not be limited solely to the illustrative embodiment.

DESCRIPTION OF THE DRAWINGS

FIG. 1 is a schematic of the water purification device according to the claimed invention installed.

DETAILED DESCRIPTION OF THE INVENTION

Figure 2A:
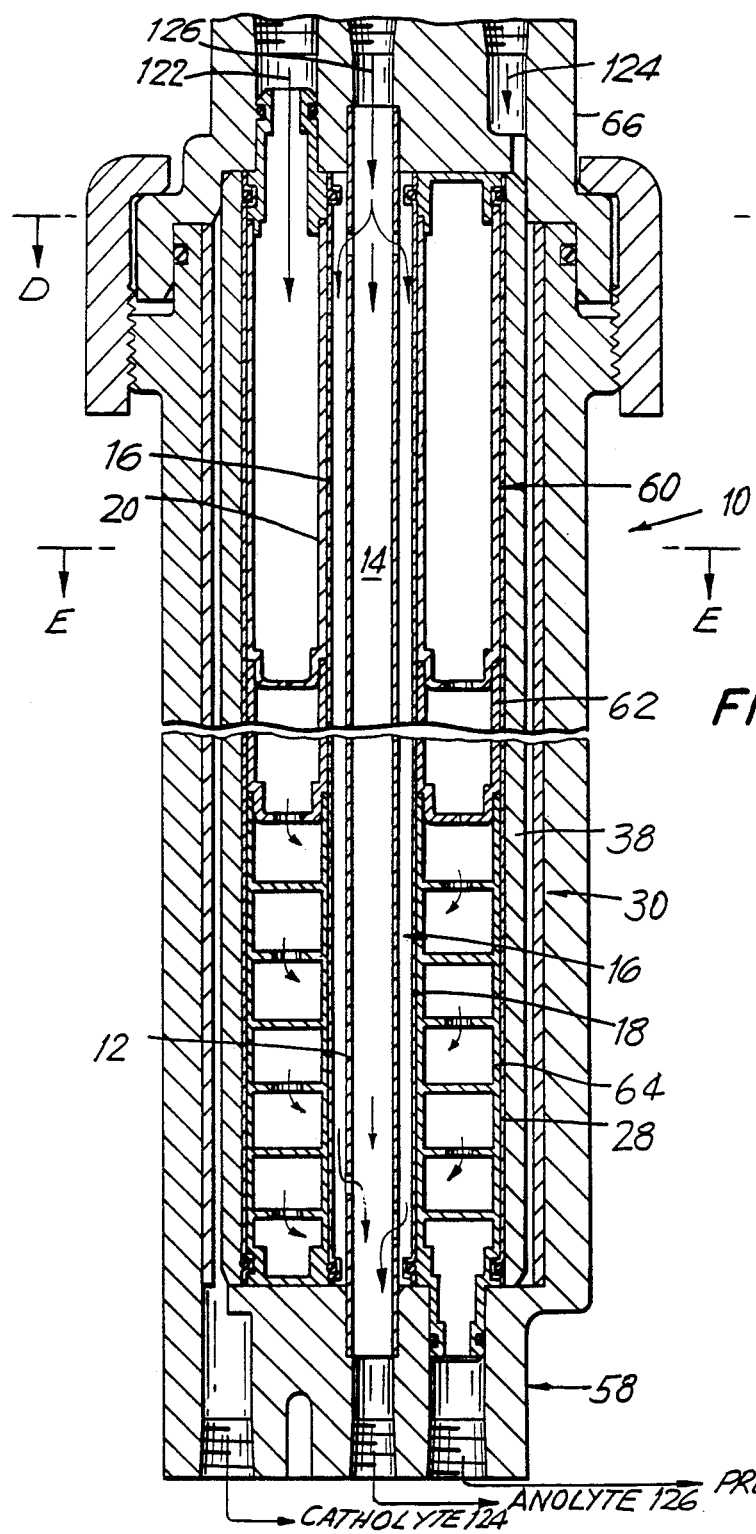
FIG. 2A is a perspective view of the assembled water purification device of the claimed invention.
Figure 2B:
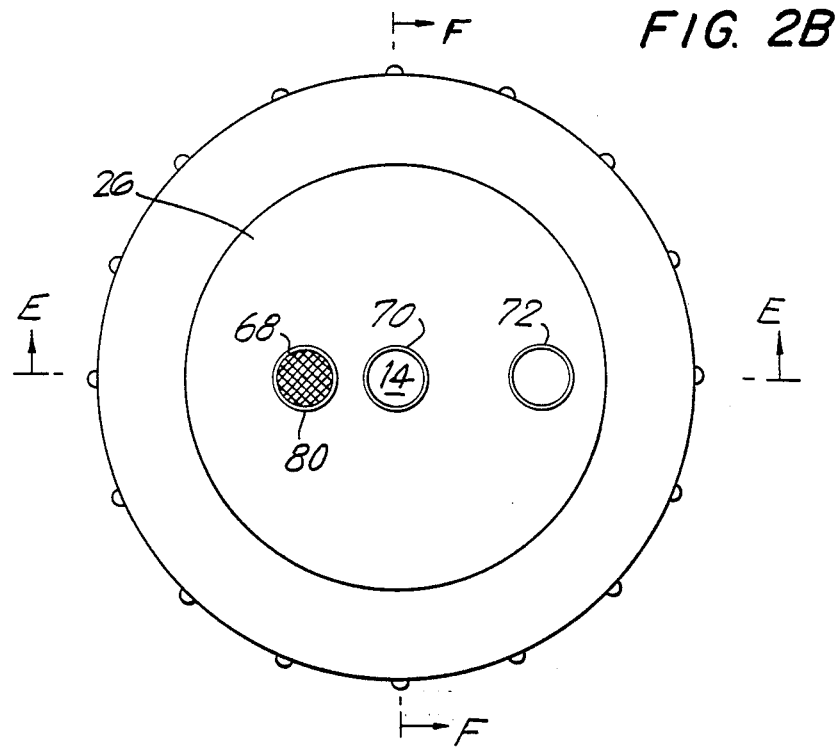
FIG. 2B is a top view of the water purification device shown in FIG. 2A.
Figure 2C:
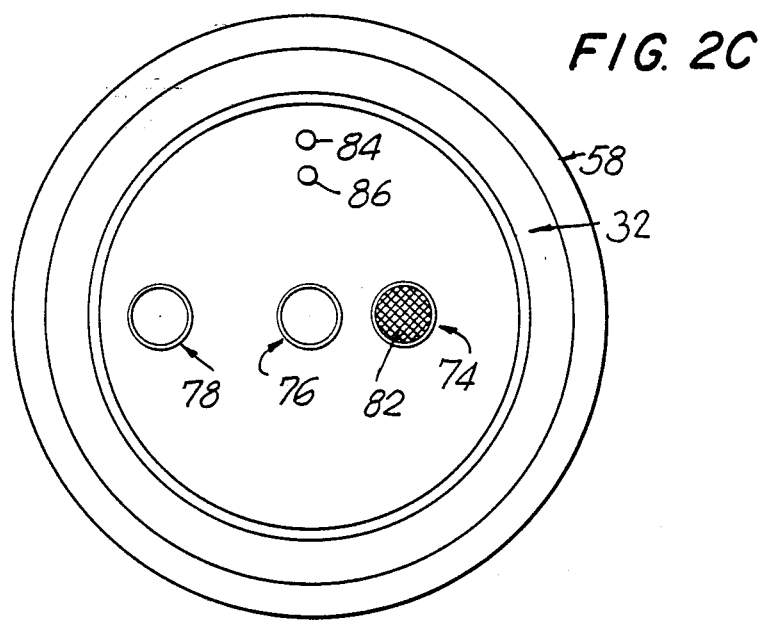
FIG. 2C is a bottom view of the water purification device shown in FIG. 2B.
Figure 2D:
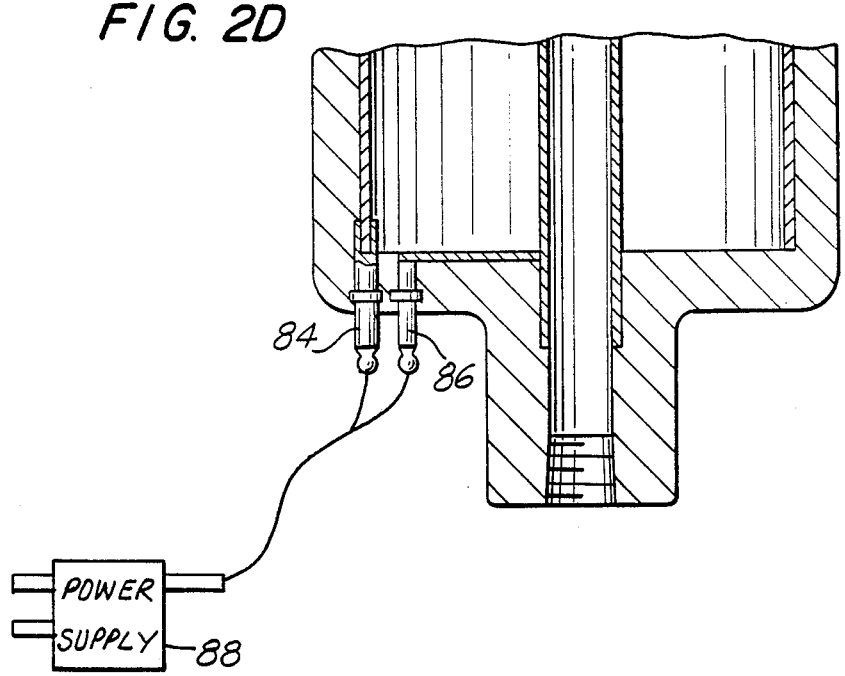
FIG. 2D is a section F-F of FIG. 2B showing the electrical connection of the terminals in the water purification device o the claimed invention.

The present invention relates to a compact water purification apparatus which is composed of a plurality of concentric sleeves or cylinders which define passageways therebetween for the passage of the water stream, anolyte stream and catholyte stream for use in a system which combines the concepts of electrodialysis with ion exchange systems. In the system of the subject invention, ion exchange resins aid the electrodialysis system by providing enhanced conductivity which is useful as the water becomes freer of such ions. Moreover, the electrodialysis mechanism aids in regenerating the resins through the disassociation of the water into hydrogen and hydronium cations and hydroxy anions. The resulting system is continually regenerating with these mechanisms of th purifier working in combination to effectively remove the required ions from water.

Referring now to the drawings, FIG. 1 is schematic representation of the purifier of the claimed invention as it is situated under the sink or in other confined space environment. Thus installed the purifier 10 of the claimed invention is connected to water source line 100 which comes from any convenient source such as city water, well water or in marine use, ocean water. Line 100 is divided at tee 102 to provide water streams 112 and 114. Water stream 112 is supplied to the purifier 10 as the pure water stream and stream 114 is further tee divided at a tee (not shown) to form streams 124 and 126. Stream 124 is the catholyte stream and stream 126 is the anolyte stream. Check valves 134 and 136 are provided to control the amount of water entering purifier 10. As will be shown in more detail with reference to FIG. 7, in another aspect of the invention, a single water stream can be used for both the catholyte and the anolyte stream. The waste water from the anolyte stream 116 exits the purifier and is mixed with the waste water from the catholyte stream at 118 to form stream 120 which is provided to the cold water faucet in the sink which is then mixed with source water from source 100 to form stream 124 which provides water for any convenient non-purified use such as dishwashing, showering and the like. Purified water passes from the purifier 10 to stream 122 for dispensing through the purified water faucet.

Figure 8:
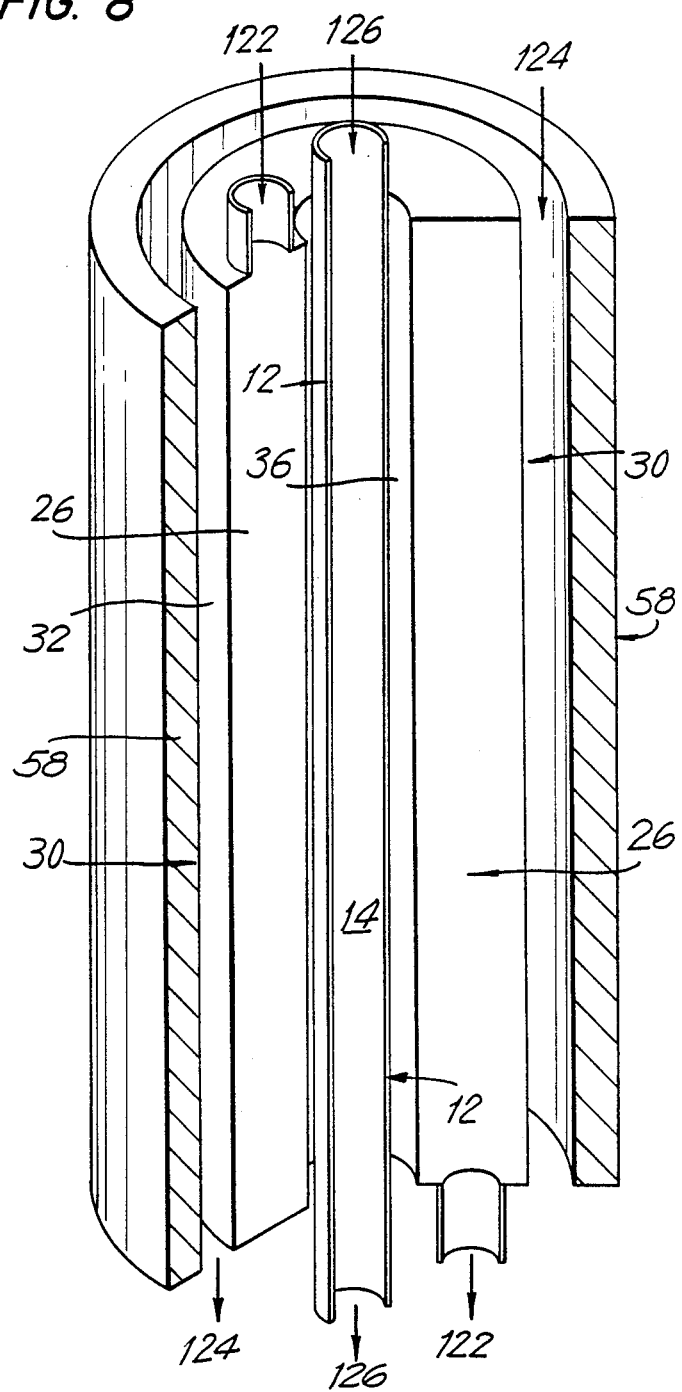
FIG. 8 is a cut-a-way view to show the basic flow path through the device.

The structure of the purifier 10 can best be seen with reference to FIG. 2A and FIG. 8. Referring to FIG. 8 which is a cross-section through the middle of the water purification device of the subject invention, the device generally consists of an hollow anode 12 with a passageway 14 down its middle. Mounted concentrically about the anode is a bead box assembly 26. Bead box assembly 26 is composed of a bead box inner portion and a bead box outer portion 20 and 24 respectively as can be best seen from FIGS. 4A, 5 and 6. The bead box assembly can be optionally formed in three or more sections, upper bead box assembly 60, middle bead box assembly 62 and lower bead box assembly 64, each composed of an inner and outer portion. Optionally, the whole bead box assembly can be formed from a unitary structure from the inner and outer bead box.

Figure 7A:
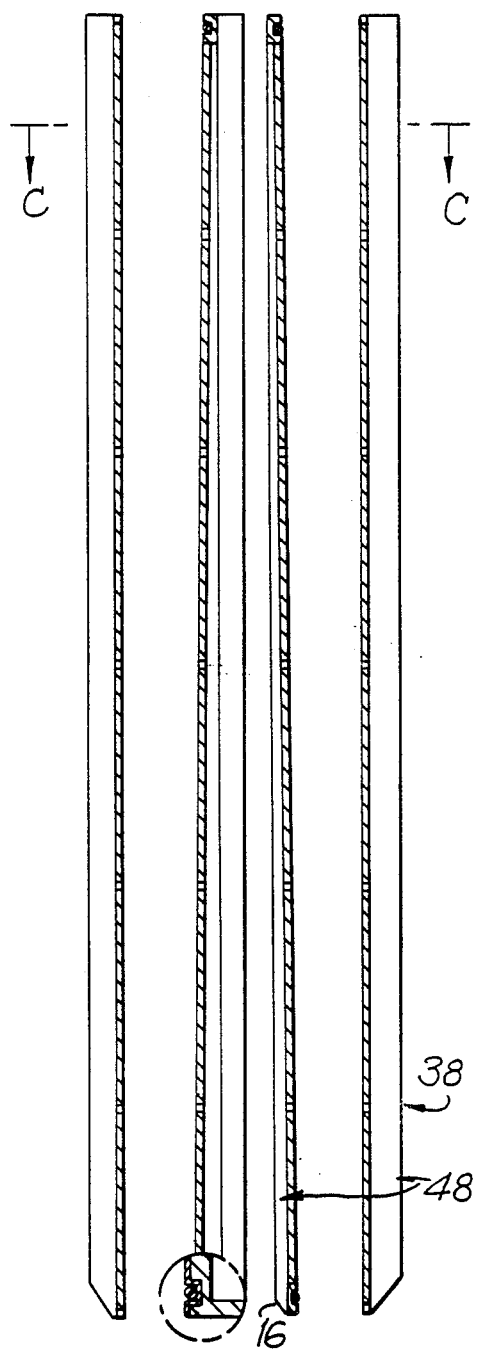
FIG. 7A is a perspective view of the spacer and ribs before they are slipped into the bead box.
Figure 7B:
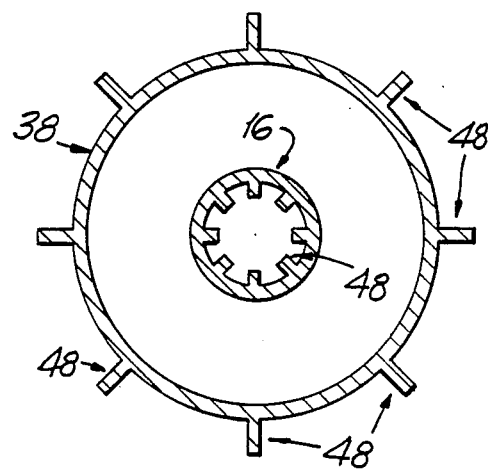
FIG. 7B is a section C-C of FIG. 7A.

As can be seen in FIG. 2A and FIG. 7A, an anionic support member 16 is concentrically mounted about anode 12. An anionic membrane 18 is mounted to the exterior of the anionic support member. A variety of mounting methods can be employed such as welding, lamination, mechanical mounting, or most preferably injection molding the membrane 18 as a plastic film, for example, 2 to 5 mils thick on the anionic support member 16. As best seen with reference to FIG. 8, a fluid space 36 is maintained by the action of the ribs 48 of the anionic support member 16 and the concentric mounting of the anionic support member 16 to allow the passage of water between the anode and the anionic membrane. Support ribs 94 and baffles 42 are provided on the inner bead box 20 to help define fluid paths in the bead box when assembled.

Figure 3:
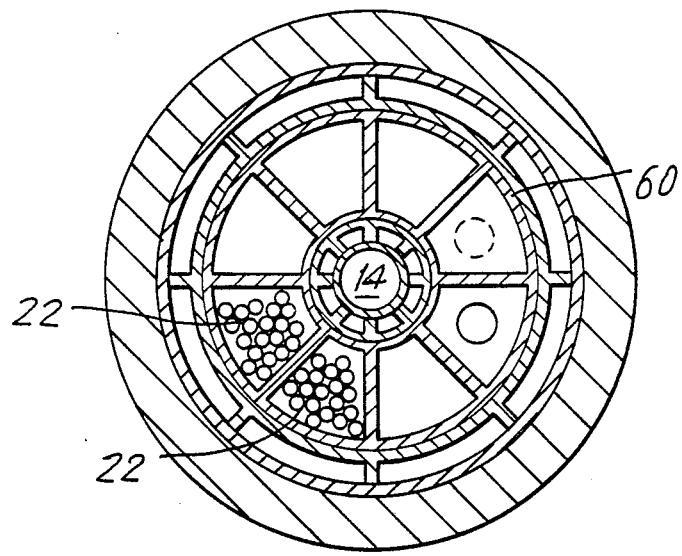
FIG. 3 is a section E-E of 2A of the water purification device of the claimed invention.
Figure 4A:
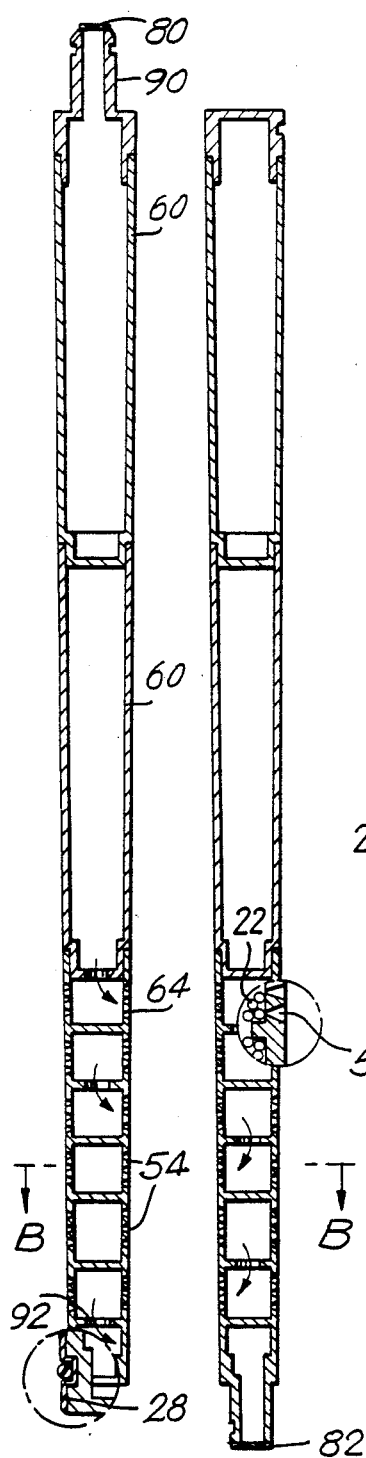
FIG. 4A is a section showing the bead box inner and outer assembled.
Figure 4B:
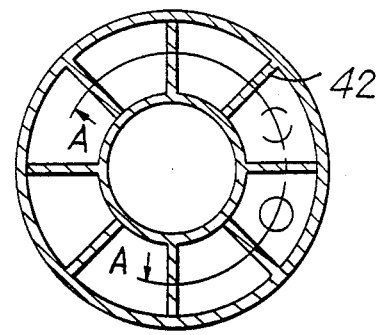
FIG. 4B is a section B-B through FIG. 4A.
Figure 4C:
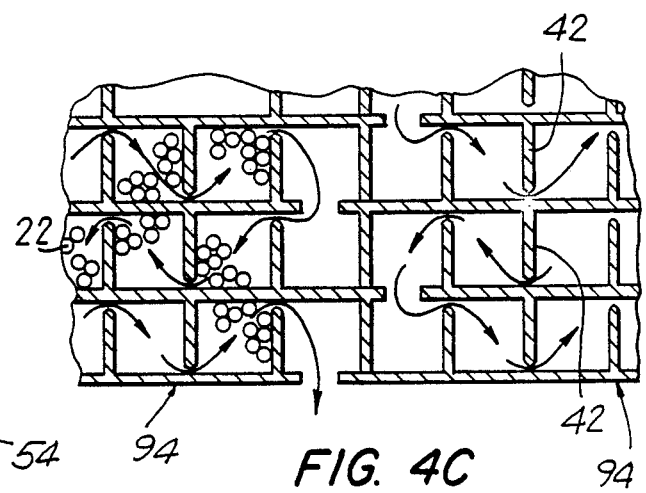
FIG. 4C is the rotation A-A in FIG. 4B.

Concentrically mounted about the anionic suppor.t membrane is a bead box assembly 26 which is shown in more detail with reference to FIGS. 4A, 4B, 5 and 6. Bead box assembly 26 holds the anionic resin beads 22. See FIGS. 3 and 4A. Bead box assembly 26 holds ionic resins preferably a mixed cationic and anionic resin beads which are in fluid communication with the anionic membrane 18 and the cationic membrane 28. The bead box assembly 26 may be assembled from two (2)

concentric cylinders which hold a packed bed of beads 22 of ion exchange resins preferably mixed cationic and anionic resins 22 therebetween. Cation and anion exchange resins suitable for water purification are known in the art. An example of anion exchange resin is a styrene divinylbenzene resin having tertiary amine exchange groups such as Sybron Chemicals' IONAC (Reg. TM) AFP-329. An example of a cation exchange resin is a crosslinked modified acrylic/divinylbenzene having RCOO—H+ exchange groups such as Sybron Chemicals, Inc.'s IONAC (Reg. TM) CC. A mixture of 70 percent cationic resin and 30 percent anionic is generaly preferred. However, the ratio may be varied depending on the composition of the source water. Preferably the bead box 26 is composed of a bead box inner 20 and a bead box outer 24 as shown in FIG. 4A, 4B and 4C. Most preferably the bead box inner 20 includes baffles 42 and support ribs 94 which when the bead box 26 is assembled from the inner and outer bead box 20 and 24 respectively, provide a compartment by their interaction which retain the beads 22 in place while allowing the water to flow across the beads.

Torturous fluid passageways are provided across the bead box by the interaction of the support ribs 94 with the bead box inner and outer which form the passageways when bead box 26 is assembled FIG. 4C is a schematic representation of the torturous flow of the fluid across the beads in use of the purification device.

Figure 5:
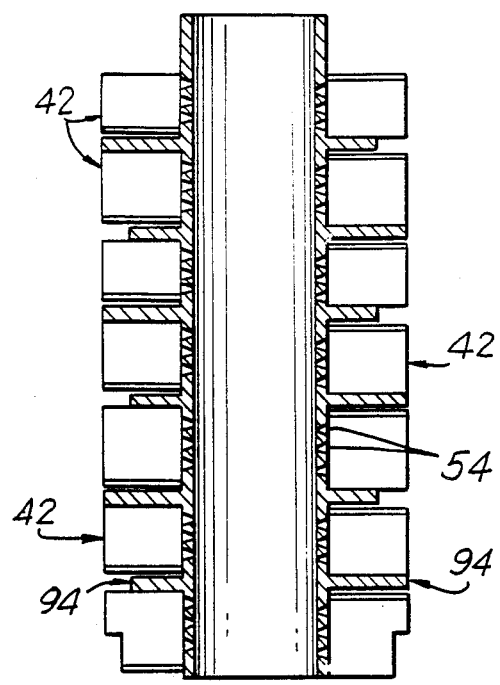
FIG. 5 is a section showing the bead box inner member.
Figure 6:
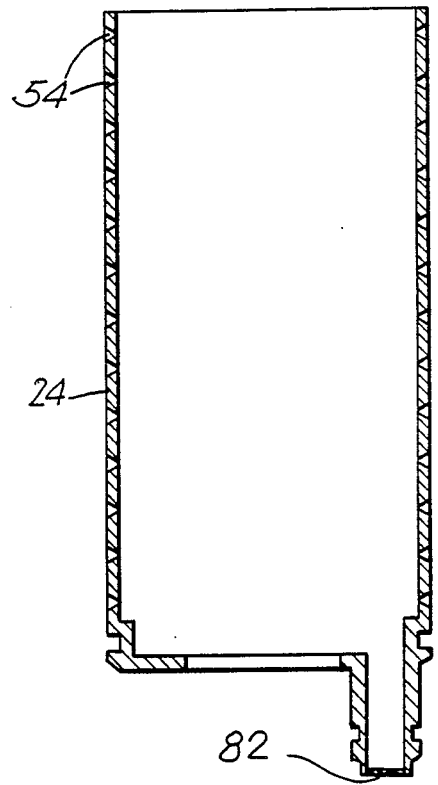
FIG. 6 is a section showing the bead box outer member.

Referring to FIGS. 5 and 6, the bead box inner 20 and the bead box outer 24 have slots 54 which provide liquid communication between the bead box inner and the anionic membrane and the bead box outer and the cationic membrane. The slots 54 preferably are small enough in size so as not to allow the ion exchange resins contained therein to pass therethrough. A cationic membrane 28 is concentrically mounted to the outer bead box 24. The cationic membrane 28 may be bonded, laminated, welded or injected molded to the outer bead box 24 or optionally it may be mechanically connected thereto. Spacer 38 is in turn concentrically mounted about bead bcx outer 24. Slots 54 are provided in bead box outer to allow fluid communication between the passageways of the bead box 26 ard the cationic membrane 28. Ions are then free to migrate through cationic membrane 28 during the water purification process and are removed from the water stream as it passes over bead box 26. In addition, the action of the ion exchange resins remove ions contained in the fluid. Spacer 38 preferably includes ribs 48 to separate the cationic membrane 28 from the cathode 30 and to provide a passageway 32 between the cathode and cationic membrane.

In a particularly preferable embodiment of the invention, the bead box inner 20, the anionic membrane support 16 and the anionic membrane 18 are injection molded into a unitary structure which results in a single cylinder. In this embodiment, the anionic membrane 18 is the inner surface of the cylinder. The inner surface of the inner bead box actually provides the anionic membrane support and the bead box itself is the outer surface of the integral concentric cylinder containing the baffles for mating with the bead box outer. Similarly, the bead box outer and the cationic membrane 28 can also be of unitary construction and made by, for example, injection molding wherein the resulting single integral cylinder contains on its inside the bead box outer 24 and membrane 28. The outer surface of the bead box outer ribs can be provided on the cationic membrane to serve the function of spacer 38. Thus, as a result, there is only required two (2) concentric cylinders to provide the cationic membrane and bead box inner member, the anionic membrane support, the anionic membrane, the bead box outer member and the spacer. This construction results in quick and easy assembly of the finished product.

Referring to the bead box outer 24, slots 54 allow for fluid communication between the passageway defined between the bead box outer and inner and the anionic membrane to occur. A cathode 30 preferably a stainless steel cathode most preferably an expanded stainless steel cathode is concentrically mounted within the body. Spacer 38 provides support to the cationic membrane and spaces the cationic membrane 28 from the concentrically mounted cathode to provide a fluid passageway 32. The resulting water purification device is compact and easy to assemble.

In operation water from water source is supplied at 100 as previously discussed with reference to FIG. 1. Water enters the purifier through stream 112 to check .valve 136. As best seen in FIG. 8, water stream 122 enters the bead box 26 and flows across the packed beads 22 and exits at the bottom of the purifier as stream 122 which is then sent to the pure water faucet on the tap. The anolyte and catholyte water streams can be provided in a variety of ways. For example, an anolyte stream can be provided through the hollow of the anode 14 and space 36 between the anode and the anionic membrane from the top. The water then flows down to the purifier. A catholyte stream can be provided through channel 32. Optionally the anolyte water stream can be turned and used as a catholyte water stream by diverting it into space 32 between the cathode and the cationic membrane to exit the top of the purifier. The resulting water is then cycled through the cold water faucet for use in ordinary uses around the household which do not require purified water.

The foregoing is considered as illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

I claim:

1. A compact water purifier comprising:
   (a) an anode having a fluid passageway through its interior to provide an anode fluid path;
   (b) a anionic membrane support member concentrically mounted about said anode;
   (c) a anionic membrane mounted to the exterior of said anionic support member;
   (d) a separating means for maintaining a first fluid passageway between said anionic membrane and said anode;
   (e) a bead box concentrically mounted about said anionic membrane support member to provide a water purification path;
   (f) ion exchange resins located in said bead box for contact with the water in said water purification path;
   (g) fluid communication means between said water purification path and said anionic membrane;
   (h) a cationic membrane concentrically mounted about said bead box;
   (i) fluid communication means between said water purification path and said cationic membrane;

(j) a cathode concentrically mounted about said cationic membrane;
(k) a separating means for maintaining a passageway between said cationic membrane and said cathode to define a second fluid passageway therebetween;
(l) means to provide an anolyte waste stream through said anode fluid path and through said first fluid passageway;
(m) means to provide a catholyte waste stream through said second fluid passageway;
wherein ionic impurities are removed from the water purification path by the combined action of electrodialysis and ion exchange resins.

2. A water purifier according to claim 1 wherien said anode is hollow and said anode fluid path is through the hollow part of the anode.

3. A water purifier according to claim 2 wherein said anode is a ceramic anode.

4. A water purifier according to claim 2 wherein said cathode is a stainless steel cathode.

5. A water purifier according to claim 2 wherein said cathode is an expanded stainless steel cathode.

6. A water purifier according to claim 1 wherien the anolyte waste stream and said catholyte waste streams are cycled to a cold water faucet for general use.

7. A water compact purifier comprising:
(a) an anode having a fluid passageway through its interior to provide an anode fluid path;
(b) a bead box inner member concentrically mounted about said anode;
(c) a bead box outer member concentrically mounted about said bead box inner member to form a bead box to hold ion exchange resin beads between said bead box outer member and said bead box inner member;
(d) a water purification path across said resin beads in said bead box;
(e) an anionic membrane mounted to said bead box inner member;
(f) said anionic membrane spaced from said anode to form a first fluid passageway betwen said anionic membrane and said anode;
(g) fluid communication means between said water purification path and said anionic membrane;
(h) a cationic membrane concentrically mounted about said outer bead box;
(i) fluid communication means between said water purification path and said cationic membrane;
(j) a cathode concentrically mounted about said cationic membrane;
(k) a separating means for maintaining a passageway between said cationic membrane and said cathode to define a second fluid passageway;
(l) means to provide an anolyte waste stream through said anode fluid path and through said first fluid passageway;
(m) means to provide a catholyte waste stream through said second fluid passageway;
wherein ionic impurities are removed from the water purification path by the combined action of electrodialysis and ion exchange resins.

8. A water purifier according to claim 7 wherein the outside of said bead box outer member is said cationic membrane which is directly mounted to the outside of said bead box outer member.

9. A water purifier according to claim 8 wherien said anionic membrane is permanently bonded to the interior of said bead box inner.

10. A water purifier according to claim 8 further comprising interacting ribs and baffles on said bead box inner and said bead box outer whereby said water purification path across said resin beads is a tortious path and said resin beads are held in place by said baffles.

11. A water purifier according to claim 10 wherein the anolyte waste stream and said catholyte waste streams are cycled to a cold water faucet for general use.

12. A water purifier according to claim 9 wherein said anionic membrane is formed by injection molding or welding said anionic membrane to said bead box inner.

13. A water purifier according to claim 12 wherein said cationic membrane is permanently bonded to the exterior of said bead box outer.

14. A water purifier according to claim 13 wherein said anionic membrane is formed by injection molding or welding said anionic membrane to said bead box inner.

15. A water purifier according to claim 7 wherein said anionic membrane is permanently bonded to the interior of said bead box inner member.

16. A water purifier according to claim 15 wherien said anionic membrane is formed by injection molding said anionic membrane to said bead box inner member.

17. A water purifier according to claim 7 further comprising interacting ribs and baffles on said bead box inner member and said bead box outer member whereby said water purification path across said resin beads is a torturous path and said resin beads are held in place by said baffles.

18. A water purifier according to cliam 7 wherein the anolyte waste stream and said catholyte waste streams are cycled to a cold water faucet for general use.

19. A water purifier comprising:
(a) a cylindrical anode having a fluid passageway through its interior to provide an anode fluid path;
(b) a cylindrical anionic membrane support member concentrically mounted about said anode;
(c) an anionic membrane mounted to the interior of said anionic support member;
(d) a separating means for maintaining a first fluid passageway having a top and bottom between said anionic membrane and said anode;
(e) a cylindrical bead box concentrically mounted about said anionic support member to provide a water purification path;
(f) ion exchange resins located in said cylindrical bead box for contact with the water in said water purification path;
(g) fluid communication means between said water purification path and said anionic membrane;
(h) a cylindrical spacer concentrically mounted about the bead box;
(i) a cationic membrane concentrically mounted about outer bead box;
(j) fluid communication means between said water purification path and said cationic membrane;
(k) a cylindrical cathode concentrically mounted about said cathode membrane;
(l) a separating means for maintaining a passageway between said cationic membrane and said cathode to define a second fluid passageway having a top and bottom therebetween;
(m) means to provide source water to the bottom of said first fluid passageway to form an anolyte stream;

(n) means to transfer said anolyte stream exiting the top of said first fluid passageway to the top of the anode fluid path;

(o) means to transfer said anolyte stream exiting at the bottom of said anode fluid path to said second fluid path to form a catholyte waste stream whereby a single waste stream is formed;

(p) means to provide the waste stream exiting the purifier to a cold water fauce for general use;

wherein ionic impurities are removed from the water purification path by the combined action of electrodialysis and ion exchange resins.

* * * * *